US009250947B2

(12) United States Patent
Anand et al.

(10) Patent No.: US 9,250,947 B2
(45) Date of Patent: *Feb. 2, 2016

(54) DETERMINING PLACEMENT FITNESS FOR PARTITIONS UNDER A HYPERVISOR

(71) Applicant: International Business Machines Corporation, Armonk, NY (US)

(72) Inventors: Vaijayanthimala K. Anand, Austin, TX (US); Richard Mankowski, Austin, TX (US); Bret R. Olszewski, Austin, TX (US); Sergio Reyes, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/799,161

(22) Filed: Jul. 14, 2015

(65) Prior Publication Data

US 2015/0317180 A1    Nov. 5, 2015

Related U.S. Application Data

(63) Continuation of application No. 13/774,466, filed on Feb. 22, 2013, now abandoned, and a continuation of application No. 13/529,790, filed on Jun. 21, 2012, now Pat. No. 9,104,453.

(51) Int. Cl.
*G06F 9/46* (2006.01)
*G06F 9/455* (2006.01)

(52) U.S. Cl.
CPC .... *G06F 9/45558* (2013.01); *G06F 2009/4557* (2013.01); *G06F 2009/45583* (2013.01)

(58) Field of Classification Search
CPC ............................................... G06F 2009/4557
USPC .......................................................... 718/1
See application file for complete search history.

(56) References Cited

U.S. PATENT DOCUMENTS

| 8,443,376 B2 | 5/2013 | Bhandari et al. |
| 8,464,267 B2 | 6/2013 | Uyeda et al. |
| 2006/0190482 A1 | 8/2006 | Kishan et al. |

(Continued)

FOREIGN PATENT DOCUMENTS

| WO | WO2010065326 | 6/2010 |
| WO | WO2011094301 | 8/2011 |

OTHER PUBLICATIONS

W. J. Armstrong et al., "Advanced virtualization capabilities of POWER5 systems", IBM J. Res. & Dev. vol. 49 No. 4/5, Jul./Sep. 2005, pp. 523-532.

*Primary Examiner* — Emerson Puente
*Assistant Examiner* — Steven Do
(74) *Attorney, Agent, or Firm* — Walter W. Duft

(57) ABSTRACT

A technique for determining placement fitness for partitions under a hypervisor in a host computing system having non-uniform memory access (NUMA) nodes. In an embodiment, a partition resource specification is received from a partition score requester. The partition resource specification identifies a set of computing resources needed for a virtual machine partition to be created by a hypervisor in the host computing system. Resource availability within the NUMA nodes of the host computing system is assessed to determine possible partition placement options. A partition fitness score of a most suitable one of the partition placement options is calculated. The partition fitness score is reported to the partition score requester.

6 Claims, 6 Drawing Sheets

(56) References Cited

U.S. PATENT DOCUMENTS

| | | |
|---|---|---|
| 2009/0055831 A1 | 2/2009 | Bauman et al. |
| 2009/0150640 A1 | 6/2009 | Royer et al. |
| 2009/0307439 A1 | 12/2009 | Jacobs et al. |
| 2010/0229175 A1 | 9/2010 | Gonzalez, Jr. et al. |
| 2011/0296406 A1 | 12/2011 | Bhandari et al. |
| 2013/0055278 A1 | 2/2013 | Zaitsev |

DETERMINING PLACEMENT FITNESS FOR PARTITIONS UNDER A HYPERVISOR

This application is a continuation under 35 U.S.C. 120 of application Ser. No. 13/774,466, filed Feb. 22, 2013, which is a continuation under 25 U.S.C. 120 of application Ser. No. 13/529,790, filed Jun. 21, 2012, entitled "Determining Placement Fitness For Partitions Under A Hypervisor."

BACKGROUND

1. Field

The present disclosure relates to virtually-partitioned computing systems. More particularly, the disclosure concerns partition placement in systems exhibiting Non-Uniform Memory Access (NUMA) characteristics.

2. Description of the Prior Art

By way of background, many current computer systems utilize NUMA-like hardware designs. In these designs, microprocessor chips have access to memory that is relatively "close" to them (low latency and high bandwidth) and also memory that is relatively "far" away (higher latency, sometimes lower bandwidth). System topologies may involve many levels of memory attachment, and as interconnections between the processors themselves.

When a virtual partition is created to provision a virtual machine (VM), it is generally necessary to allocate a set of resources for the partition. In the case of some resources, such as processors, the resource mappings can be soft. For example, a "home processor" for a virtual processor of a shared processor partition is a physical processor where the virtual processor prefers to run, but it may run on other physical processors as well. Other resources, such as memory, tend to be more persistent. Because there is a relationship between the resource mappings and dynamic execution performance, resource placement can be very important.

The NUMA properties of many computer systems can create rather large performance differences between partitions with "good" placement versus "bad" placement. As an example consider the two partition placements shown in FIG. 1. In this case, a first partition that comprises CPU core 0 on processor chip A has been allocated memory from physical memory X that is locally attached to processor chip A. A second partition that comprises CPU core 1 on processor chip A has been allocated memory from physical memory Y. This memory is locally attached to processor chip B but is remote with respect to processor chip A. For many workloads, the need for remote memory accesses in the second partition will produce a performance penalty. Remote accesses to high speed I/O can also introduce problems, particularly when large amounts of data are involved.

By way of further background, it is becoming increasingly popular to use resource management tools to automatically create partitions and start them on systems. In cloud computing environments, these management tools typically manage multiple systems at the same time. This allows the management tool to select, from a set of systems, the specific system where the partition will be started. Typically, these management tools have a view of the resource usage of the systems at a very high level. For example, they may understand if the system has available processor and memory capacity. However, as far as known, the actual resource usage is not exposed in a granular enough way to determine if a partition will fit well upon a system or not. Thus, existing management tools are not able to judge whether a particular partition placement will be "good" or "bad" from the standpoint of resource access performance.

It is to improvements in the field of virtually partitioned computing systems that the present disclosure is directed. In particular, applicants disclose a technique that allows a resource management tool to evaluate the ability of a system with NUMA-like hardware designs to support particular partition requirements.

SUMMARY

A system, method and computer program product are provided for determining placement fitness for partitions under a hypervisor in a host computing system having non-uniform memory access (NUMA) nodes. In an embodiment, a partition resource specification is received from a partition score requester. The partition resource specification identifies a set of computing resources needed for a virtual machine partition to be created by a hypervisor in the host computing system. Resource availability within the NUMA nodes of the host computing system is assessed to determine possible partition placement options. A partition fitness score of a most suitable one of the partition placement options is calculated. The partition fitness score is reported to the partition score requester.

In an embodiment, the partition fitness score reflects an ability of the hypervisor to provision the computing resources within a single one of the NUMA nodes. In an embodiment, the partition fitness score comprises predetermined categories or a numeric gradation value that may be weighted to favor different resource characteristics. In an embodiment, a reservation request is received based on the partition fitness score, and computing resources for use in fulfilling a partition provisioning request are reserved. In an embodiment, the partition fitness score reflects an ability of the hypervisor to provision the computing resources within a single resource pool in the host computing system. In an embodiment, the partition fitness score reflects an ability of the hypervisor to provision computing resources for a set of partitions.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Introduction

In embodiments disclosed herein, a technique is proposed whereby a partition resource manager agent or other partition management tool is given the ability to ask a host system to score a particular set of partition resource requirements with respect to the available underlying resources of the system. Such resources may include, but are not limited to CPUs, memory, I/O (input/output) resources, hardware accelerators (such as compression assists or field-programmable gate arrays), etc. The partition fitness score allows the resource manager agent to make informed decisions regarding the host system's capabilities, such as by allowing other host systems to be queried if the first system cannot provide a suitable score, or by allowing the resource manager agent to issue parallel scoring requests to different hosts. In an embodiment, a reservation option may be provided so that a proposed partition with a good fitness score can be temporarily "locked down" to preserve the status quo until the partition can be provisioned. In another embodiment, the resource manager agent may request fitness scoring for a set of partitions, such as partitions that run components of a common workload. In still another embodiment, the resource manager agent may request a score that reflects the ability of the host system to create a partition from an assigned resource pool, such as a pool allocated pursuant to a software license.

Example Embodiments

Figure 1:
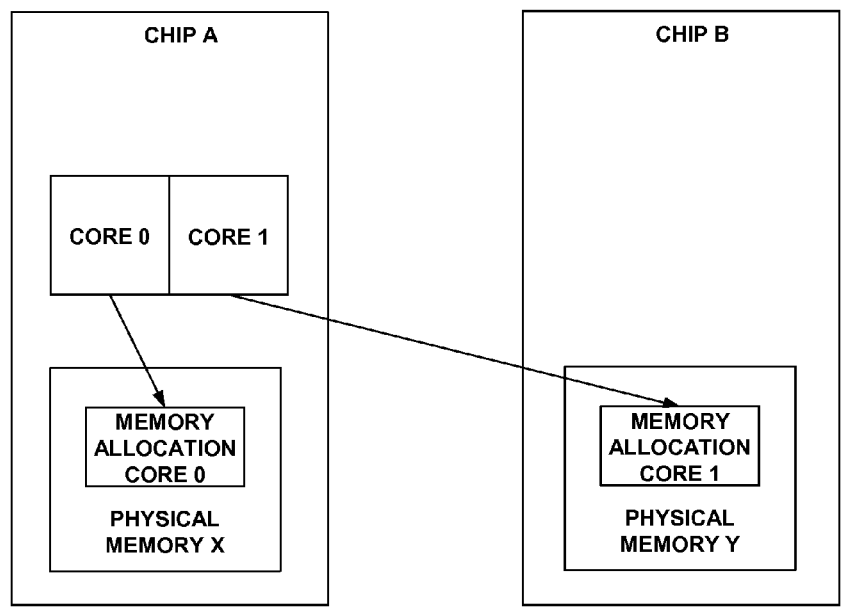
FIG. 1 is a functional block diagram showing a prior art NUMA system provisioned with two partitions respectively representing "good" and "bad" partition placements.
Figure 2:
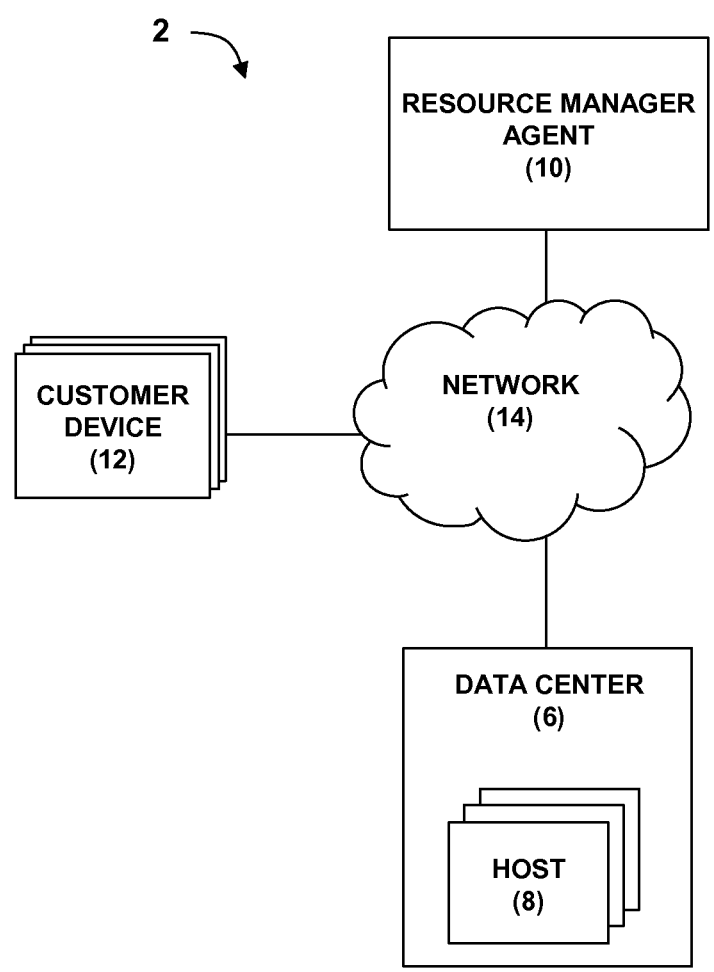
FIG. 2 is a functional block diagram showing an example computing environment that may be used to implement the subject matter of the present disclosure.

Turning now to the drawing figures, FIG. 2 illustrates an example computing environment 2 representing one possible embodiment that may be used to practice the subject matter disclosed herein. For purposes of example only, and not by way of limitation, the computing environment 2 is based on a cloud network model that includes a cloud data center 6 comprising one or more physical server hosts 8. As is conventionally known, a resource manager agent 10 may be provided to provision virtualized resources of the hosts 8 within the data center 6 in response to resource requests from customer devices 12. Each resource request from a customer device 12 may specify a desired level of computing power, such as some number of processors, a memory size, a storage capacity, a network capacity, and other resource requirements. Based on the resource request, the resource manager agent 10 will select one or more of the hosts 8 from which to provision one or more logical partitions (LPARs) on behalf of the requesting customer device 12. Each LPAR will comprise the specified subset of computing resources that will typically be controlled by a single operating system instance capable of supporting the execution of one or more user applications.

The resource manager agent 10 may be located outside the data center 6 or may be disposed within it. FIG. 2 illustrates an embodiment in which the resource manager agent 10 is outside the data center 6, and communicates with the latter via a communication infrastructure, such as a network 14. The resource manager agent 10 may also communicate with the customer devices 12 via the network 14. If the resource manager server 10 were located within the data center 6, it could embodied in one (or more) of the hosts 8, or implemented in any other suitable manner.

The resource manager agent 10 includes a conventional customer interface that interacts with the customer devices 12 to support to partition resource requests. The resource management server 10 further includes conventional authentication-selection-provisioning logic whose functions may include (1) authenticating a requesting customer device 12, (2) allowing the customer device to specify partition computing resources, and (3) provisioning a suitable partition on a host 8 within the data center 6. The foregoing components of the resource manager server are known in the art of cloud computing and will not be described in further detail herein in the interest of brevity. One example system that may be used to implement the resource manager agent 10 is the IBM® Workload Deployer. Other commercial systems that perform similar functions are also available.

Figure 3:
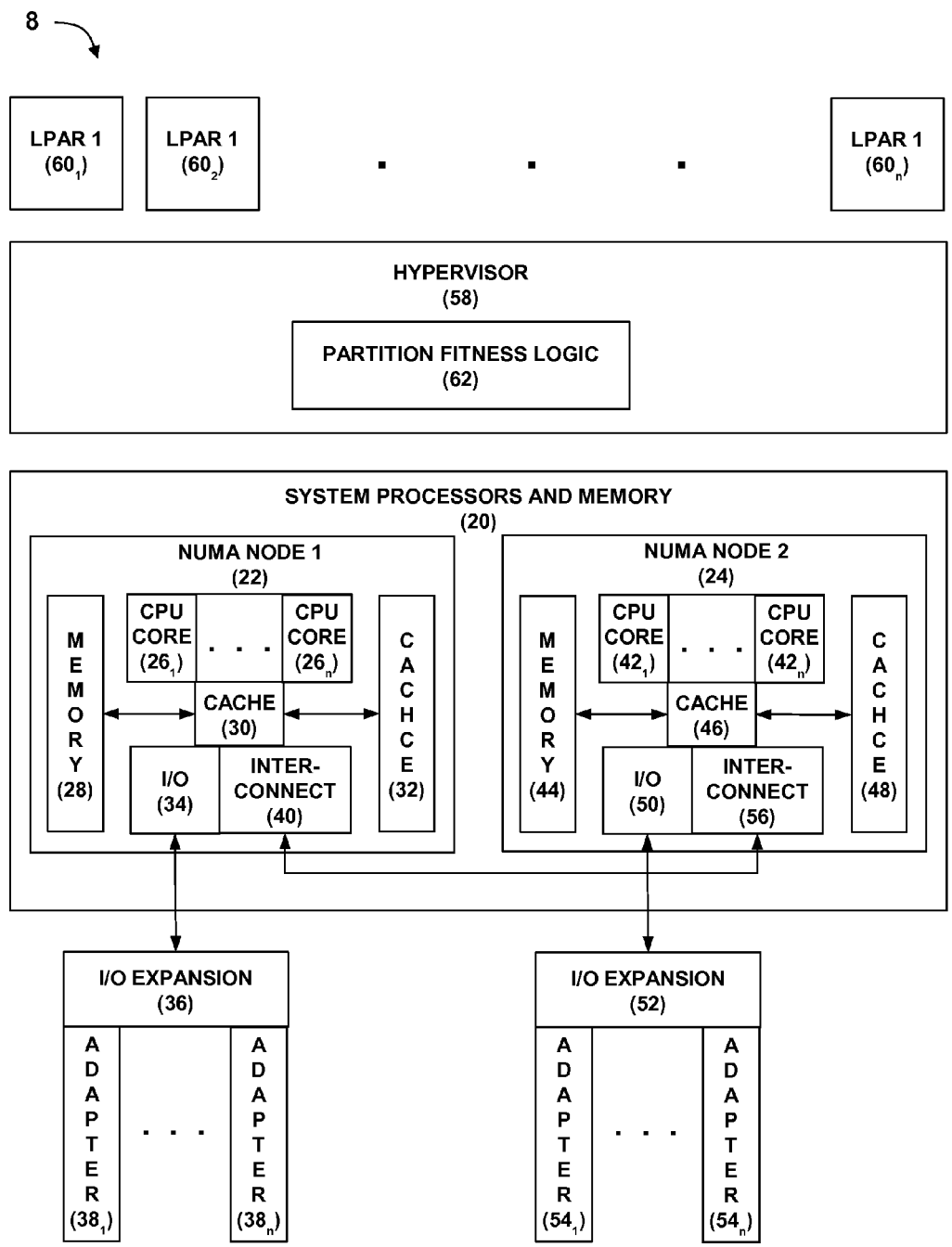
FIG. 3 is a functional block diagram showing an example NUMA system that may be implemented within the computing environment of FIG. 2.

Turning now to FIG. 3, an example implementation of a host 8 is shown. In the illustrated embodiment, the host 8 is a NUMA system similar to the IBM® Power Series® architecture. Other NUMA designs could also be used. The hardware of the host 8 includes as set of system processors and memory 20 that are physically arranged to define a set of NUMA nodes, two of which are shown by reference numbers 22 and 24.

NUMA node 22 includes as set of CPU cores $26_1 \ldots 26_n$ and a memory 28. The CPU cores $26_1 \ldots 26_n$ may be integrated on a processor chip that also includes various levels of cache memory, including level 1 instruction and data caches within the cores themselves, a level 2 cache 30 and a level 3 cache 32. An I/O controller hub 34 interfaces NUMA node 22 to an I/O expansion bus 36. This bus connects to a set of I/O adapters $38_1 \ldots 38_n$ that may connect to storage devices, network devices and/or other hardware. A node interconnect controller 40 connects NUMA node 22 to NUMA node 24.

NUMA node 24 is identical to NUMA node 22. It includes as set of CPU cores $42_1 \ldots 42_n$, and a memory 44. The CPU cores $42_1 \ldots 42_n$ may be integrated on a processor chip that also includes various levels of cache memory, including level 1 instruction and data caches within the cores themselves, a level 2 cache 46 and a level 3 cache 48. An I/O controller hub 50 interfaces NUMA node 24 to an I/O expansion bus 52. This bus connects to a set of I/O adapters $54_1 \ldots 54_n$ that may connect to storage devices, network devices and/or other hardware. A node interconnect controller 56 connects NUMA node 24 to NUMA node 22.

The software of the host 8 of FIG. 3 includes a hypervisor 58. As is known, a hypervisor (also known as a virtual machine monitor or VMM) is a low level software service that virtualizes the underlying hardware to provide a subset of the sharable hardware resources on behalf of LPARs (also known as virtual machines). Except as modified to support the functionality described herein, the hypervisor 58 may be implemented according to any of the design concepts that have been in use since hypervisors were first developed in the late 1960s (taking into account the VM support capabilities of the underlying hardware). Insofar as the host 8 of FIG. 8 is based on the IBM® Power Series® architecture, the native hypervisor of that product may be used as a starting point for implementing the hypervisor 58. Other well known hypervisor products could be used on other hardware, including the current zVM™ hypervisor used in the IBM System Z®/Z-Series® mainframe products, as well as any of a variety of hypervisors that are presently available for hardware platforms based on the Intel x86 architecture.

The hypervisor 58 is designed to support a set of LPARs $60_1 \ldots 60_n$. Each LPAR $60_1 \ldots 60_n$ is provisioned with a set of partition resources that each represent a subset of the various hardware resources of the host 8, such as one or more CPU cores, memory regions, and I/O adapters. The partition resources are managed by an operating system instance that runs user-level application software. It is the job of the hypervisor 58 to maintain isolation between the LPARs $60_1 \ldots 60_n$, such that the operating system instances and user-level application software of one LPAR are not able to access resources belonging another LPAR.

Figure 4:
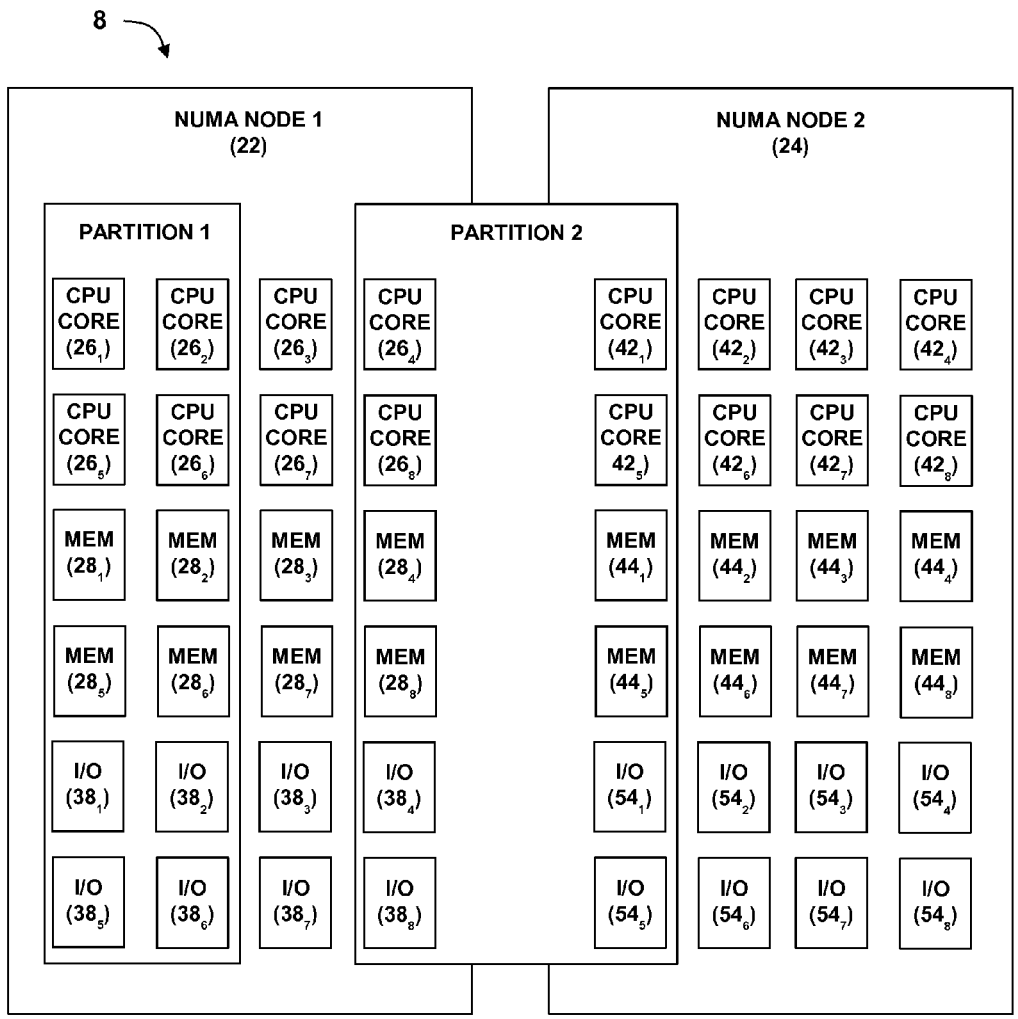
FIG. 4 is a functional block diagram showing example partitions of the NUMA system of FIG. 3.
Figure 5:
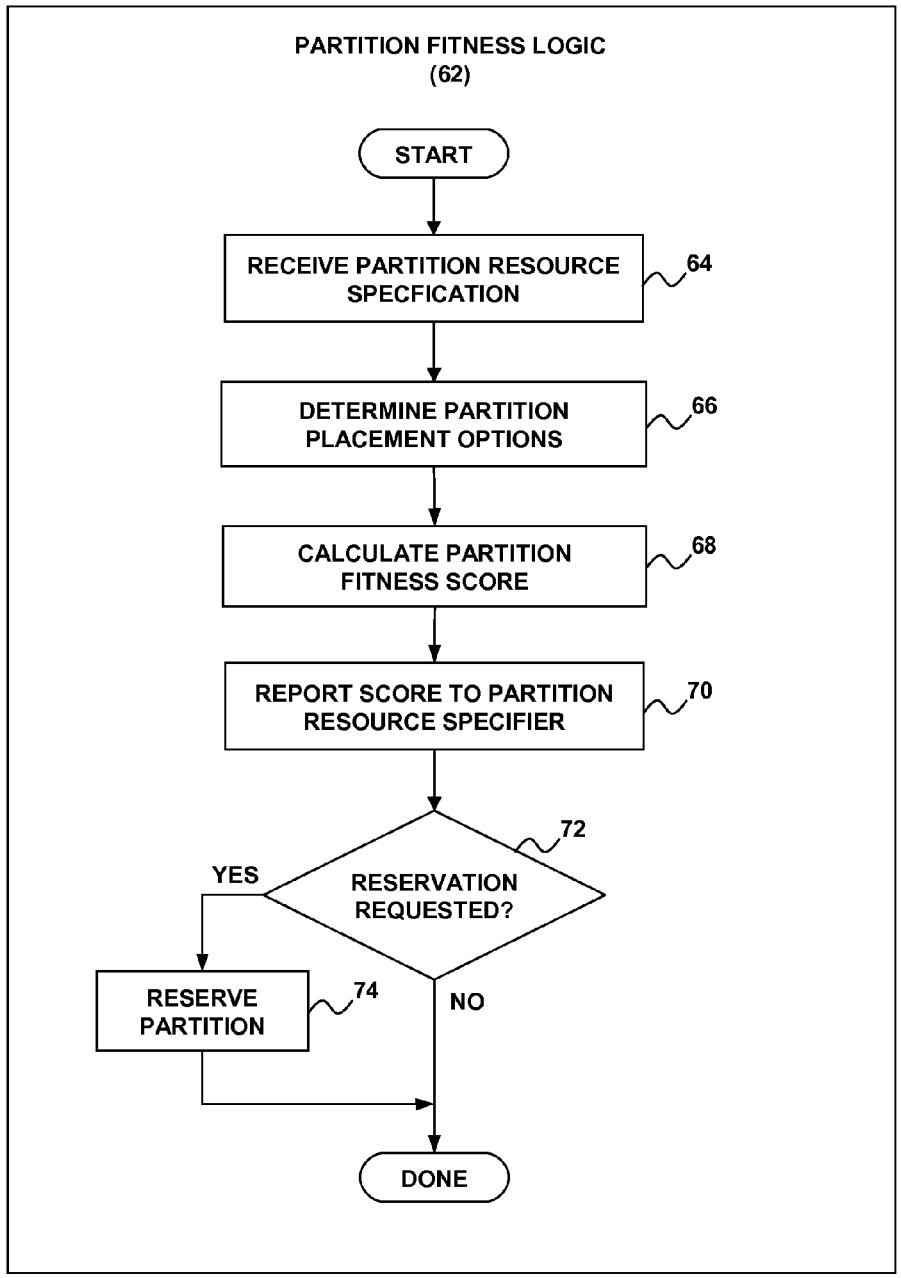
FIG. 5 is a flow diagram showing example partition fitness logic that may be implemented in accordance with the present disclosure.

Each LPAR $60_1 \ldots 60_n$ may be completely contained within a single NUMA node of the host 8 (e.g., NUMA node 22 or 24), or it may span several NUMA nodes (e.g., NUMA nodes 22 and 24, as well as additional NUMA nodes that may be present). This is exemplified by FIG. 4, which shows an embodiment of the host 8 in which NUMA nodes 22 and 24 each have eight CPU cores ($26_1 \ldots 26_8$ and $42_1 \ldots 42_8$, respectively), eight memory modules ($28_1 \ldots 28_8$ and $44_1 \ldots 44_8$, respectively), and eight I/O adapters ($38_1 \ldots 38_8$ and $54_1 \ldots 54_8$, respectively). In FIG. 4, Partition 1 is wholly contained within NUMA node 22, but Partition 2 spans both of NUMA nodes 22 and 24.

Unfortunately, the performance of Partition 2 may suffer a performance penalty due to the NUMA characteristics of the host 8. In particular, within each partition, all memory and I/O resources are accessible to any CPU core, but local accesses within a single NUMA node are typically faster than remote accesses between NUMA nodes for many workloads. Modern hypervisors are aware of this effect and are designed to provision partitions so that they span as few NUMA nodes as possible. However, today's hypervisors do not allow a partition requesting entity, such as the resource manager agent 10 (FIG. 2), to specify the location of partition resources. The resource manager agent 10 would specify the resource requirements for the partition in terms of CPU cores, memory size, and I/O utilization. The resource manager agent 10 would not be aware of the location of available resources within the host 8 that could be used to satisfy the partition request. On the other hand, the hypervisor 58 that manages the host 8 is aware of such information as part of its conventional functionality.

The present disclosure provides a mechanism whereby the fitness of a requested partition in terms of resource locality within the host 8 is determined by the hypervisor 58 and reported to the resource manager agent 10 upon request. This allows the resource manager agent 10 to assess whether to use the host 8 to provide the partition, or perhaps to utilize a different host whose available resources are more favorably distributed. This new functionality within the hypervisor 58 is shown in FIG. 3 as the partition fitness logic 62. In an example embodiment, the partition fitness logic 62 evaluates a specific set of partition resource requirements submitted by the resource management agent 10 with respect to the available resources of the host 8 that may be assigned to the potential partition. A partition fitness score is generated that indicates the fitness of the potential partition if it were started at the present time. An example partition fitness score request might take the following form:

scorepotentialpartition (4 virtual processors, 256 GB memory, low I/O requirement)

The partition fitness score may return as a range of goodness. Possible responses could be quite simple:
  No Resources
  Bad Placement
  Good Placement In this example, the "No Resources" score would indicate that there are insufficient resources in the host 8, considered as a whole, to satisfy the partition requirements. This would be the case in FIG. 4, for example, if additional partitions were already provisioned on NUMA Node 1 and NUMA Node 2 such that there are not enough CPU cores, memory modules, or I/O adapters to support the potential partition. The "Bad Placement" score would indicate that there is no one NUMA node with available resources that can satisfy the partition requirements so that it would be completely contained within a single node. In FIG. 4, for example, NUMA Node 1 has two available CPU cores $26_3$ and $26_7$, two available memory modules $28_3$ and $28_7$, and two available I/O adapters $38_3$ and $38_7$. NUMA Node 2 has six available CPU cores $42_2$, $42_3$, $42_4$, $42_6$, $42_7$, and $42_8$, six available memory modules $44_2$, $44_3$, $44_4$, $44_6$, $44_7$, and $44_8$, and six available I/O adapters $54_2$, $54_3$, $54_4$, $54_6$, $54_7$, and $54_8$. The "Bad Placement" score might be returned if the potential partition required seven or eight CPU cores, seven or eight memory modules, or seven or eight I/O adapters. In that case, neither NUMA Node would have sufficient available resources to provision the partition so that it would be completely contained within a single node. Only a partition that spans both NUMA Node 1 and NUMA node 2 could be provisioned, but this would be a sub-optimal placement, as discussed above. The "Good Resources" score would indicate that the proposed partition can be provisioned so that its resources are wholly contained within one of NUMA node 1 or NUMA Node 2. In FIG. 4, for example, a potential partition that requires no more than two CPU cores, two memory modules, and two available I/O adapters could be provisioned so that its resources are completely contained within either NUMA Node 1 or NUMA Node 2. A potential partition that requires three to six CPU cores, three to six memory modules, and three to six I/O adapters could be provisioned so that its resources are completely contained within NUMA Node 2.

The foregoing partition scoring scheme may be extended, if desired, by adding one or more additional score levels, such as the following:
  No Resources
  Bad Placement
  Mediocre Placement
  Good Placement In this example, the "Mediocre Placement" score represents a partition whose requirements cannot be satisfied with a "Good Placement" score, but also does not warrant a "Bad Placement" score. One example would be a situation where a single NUMA Node has a sufficient number of available CPU cores and memory modules, but an insufficient number of I/O adapters.

In a further example, the partition fitness score could be based on a numeric scheme that comprises a number of graded score levels, such as 1 . . . 64. In this example, a score of "1" might represent a situation where the resource requirements of the potential partition cannot be satisfied at all, and a score of "64" might indicate that all of the resource requirements can be satisfied by a single NUMA node. Intermediate scores could be established to signify different partition fitness levels that lie between the two endpoint scores. Many different scoring algorithms could be used. For example, consider a potential partition that requires 64 CPU cores. A score of "64" might indicate there is one NUMA node having 64 available cores that can fully satisfy the partition requirements. A score of "63" might indicate there is one NUMA node that has 63 available cores and another NUMA node with 1 available core. In that case, some remote memory accesses may be required, but the bulk of the memory accesses will be local. A weighted score could also be used that favors different types of resources. For example, because individual tasks have a tendency to move, sometimes frequently, between CPU cores, it may be less important to have all of a partition's CPU cores within a single NUMA node than it is to have all of the memory modules within that node. A NUMA node's I/O capacity may also be weighted in relation to other resources if a potential partition's I/O requirements are significant (e.g., a dedicated physical I/O adapter is needed). The foregoing scoring methods are set forth for purposes of example only, and not by way of limitation. Persons of ordinary skill in the art having benefit of the present disclosure will no doubt devise other partition fitness scoring techniques, and such techniques are considered to be within the scope of the subject matter set forth herein.

If desired, the partition fitness logic 62 (FIG. 3) could be configured with a reservation option that allows the resource management agent 10 (FIG. 2) to lock down resources for a potential partition that scores well. This would allow multiple resource management agents 10 to operate on the same hosts in parallel without conflict. Additionally, the reservation could be conditional, based on a minimum acceptable outcome. For example, a good partition fitness score may warrant reservation, but a bad score may not. As a further alternative, the partition fitness logic 62 could be configured to score a set of potential partitions specified by a single resource management agent 10. The partition fitness logic 62 could be further configured to allow the resource manager agent 10 to specify that the potential partition is intended for a managed subset of the host resources, such as a resource pool defined by a software license. In that case, the partition fitness logic 62 could determine how it had allocated resources for the pool, and whether the potential partition would fit within the pool.

FIG. 4 is a flow diagram illustrating example operations that may be performed by the partition fitness logic 62. In block 64, the partition fitness logic receives a partition resource specification as a part of a request to generate a partition fitness score. As described above, the potential partition may be specified in terms of its resource needs for various types of resources, including CPU cores, memory, I/O, etc. Addition information, such as the identification of a resource pool or other management subset of the host 8 that constrains or otherwise affects the partition placement, may also be provided. In block 66, the partition fitness logic 62 assesses resource availability within the various NUMA nodes of the host 8 to determine possible partition placement options. For this purpose, the partition fitness logic 62 may consult existing partition state information maintained by the hypervisor 58 as part of its conventional operations. In block 68, the partition fitness logic 62 calculates a partition fitness score for the various partition placement options to determine the most suitable option. In block 70, the partition fitness logic 62 reports the (highest) partition fitness score to the partition resource specifier (e.g., the resource manager agent 10 of FIG. 2). If the partition fitness logic 62 is configured with a reservation option, it may implement block 72 to process a reservation request, thereby locking down the specified resources in block 74.

The partition fitness logic 62 may run on any of the NUMA nodes within the host 8, or it may execute on a dedicated processor within the host having its own memory and I/O adapter resources. In either case, the partition fitness logic 62 may be implemented in software, firmware or a combination thereof, and possibly with some (or all) operations being performed by dedicated hardware logic. If implemented in software, the partition fitness logic 62 may be loaded from any persistent storage device attached to the host into a suitable portion of the host's memory that comprises RAM. If implemented in firmware, the partition fitness logic 62 could reside in a portion of the host's memory that comprises ROM, such as EPROM memory. The partition fitness logic 62 may comprise a collection of program instructions, possibly having entry and exit points, written in a suitable programming language. Such programming languages may include, but are not limited to, a high level procedural language such as C, a high level object oriented language such as C++, an interpreted language such as Java, BASIC, Perl, Python, or a lower level language such as assembly. The program instructions written in such languages may be compiled and/or interpreted and/or assembled (as the case may be) into machine language program instructions that are capable of execution on one or more processors of the host 8. When the machine language program instructions are loaded into and executed by such processor(s), the resultant programmed host 8 becomes a particular machine for practicing the subject matter described herein. The program instructions of the partition fitness logic 62 may be embodied in one or more modules, each of which may be compiled and linked into an executable program, installed in a dynamically linked library, or otherwise made ready for invocation and execution by the host 8. The module(s) may be implemented to run with or without the support of an underlying hypervisor (or operating system). They may be callable from other modules or from themselves, and/or may be invoked in response to detected events or interrupts.

As previously mentioned, one or more operations of the partition placement logic 62 could be implemented using dedicated logic hardware. Examples of such hardware would include connected logic units such as gates and flip-flops, and/or integrated devices, such as application specific integrated circuits (ASICs), field programmable gate arrays (FPGAs)), reconfigurable data path arrays (rDPAs) or other computing devices. The design, construction and operation of such devices is well known in the art, and will not be described further herein in the interest of brevity.

Accordingly, a technique has been disclosed for determining placement fitness for partitions under a hypervisor. Advantages of the disclosed technique include the ability to provide a generic and portable abstraction of machine resources around partition placement in a host, or within a host resource pool, in order to allow requesting entities to score the fitness of potential partitions. If there are plural host systems, such entities can request partition fitness scores from multiple hosts in order to determine which host is most suitable. In either case, the abstraction of a score relieves the requesting entity of the responsibility of understanding potentially complex NUMA topologies.

It will be appreciated that the foregoing concepts may be variously embodied in any of a machine implemented method, a computing system, and a computer program product. Example embodiments of a machine-implemented method have been described in connection with FIG. 2-5. Example embodiments of a computing system has been described in connection with FIGS. 2 and 3. With respect to a computer program product, digitally encoded program instructions may be stored on one or more data storage media for use in controlling a CPU or other instruction processing device to perform operations. The program instructions may be embodied as machine language code that is ready for loading and execution by the machine apparatus, or the program instructions may comprise a higher level language that can be compiled and/or interpreted and/or assembled into machine language. Example languages include, but are not limited to C, C++, Java, assembly, to name but a few. When implemented on a machine apparatus comprising a processor, the program instructions combine with the processor to provide a particular machine that operates analogously to specific logic circuits, which themselves could be used to implement the disclosed subject matter.

Figure 6:
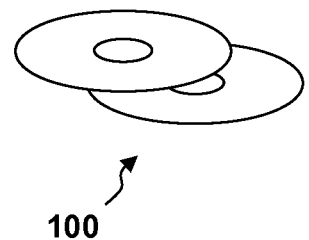
FIG. 6 is a diagrammatic illustrate of example data storage media that may be used to store program instructions for implementing the partition fitness logic of FIG. 5.

Example computer-readable storage media for storing digitally encoded program instructions are shown by reference numerals 28 and 44 (memory) of the host 8 in FIG. 3. A persistent storage device attached to the host 8 could also provide a computer-readable storage media. A further example of computer-readable storage media that may be used to store the program instructions is shown by reference numeral 100 in FIG. 6. The storage media 100 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such storage media can store the program instructions either alone or in conjunction with an operating system or other software product that incorporates the required functionality. The storage media could also be provided by portable magnetic or electrical storage media (such as floppy disks, USB flash devices, etc.). The storage media may also be combined with drive systems (e.g. disk drives), or incorporated in a computing system (e.g., as random access memory (RAM), read-only memory (ROM) or other semiconductor or solid state memory). More broadly, the storage media could comprise any electronic, magnetic, optical, magneto-optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by a computing system, the resultant programmed system becomes a particular machine for practicing embodiments of the method(s) and system(s) described herein.

Although various embodiments of the invention have been described, it should be apparent that many variations and alternative embodiments could be implemented in accordance with the present disclosure. It is understood, therefore, that the invention is not to be in any way limited except in accordance with the spirit of the appended claims and their equivalents.

What is claimed is:

1. A method for determining NUMA node placement fitness for virtual machine partitions that can be provisioned on said NUMA nodes with each virtual machine partition occupying one or more of said NUMA nodes, said virtual machine partitions being managed under a hypervisor in a host computing system having non-uniform memory access (NUMA) nodes, and each comprising a set of computing resources that include processor, memory and I/O resources, comprising:

receiving from a partition score requester a partition resource specification identifying a set of computing resources, including processor, memory and I/O resources, needed for a virtual machine partition to be created by a hypervisor in said host computing system, said partition score requester being a resource manager agent that provisions virtual resources in response to resource requests from customer devices;

assessing resource availability within the NUMA nodes of said host computing system to determine possible partition placement options representing one or more NUMA nodes where said virtual machine partition with said needed computing resources could be provisioned;

calculating a partition fitness score of a most suitable one or more NUMA nodes representing one of said partition placement options;

said partition fitness score reflecting an ability of said hypervisor to provision said computing resources within a single one of said NUMA nodes; and reporting said partition fitness score to said partition score requester.

2. The method of claim 1, wherein said partition fitness score comprises predetermined categories.

3. The method of claim 1, wherein said partition fitness score comprises a numeric gradation value that is weighted to favor different resource characteristics.

4. The method of claim 1, further including receiving a reservation request based on said partition fitness score and reserving said computing resources for use in fulfilling a partition provisioning request.

5. The method of claim 1, wherein said partition fitness score reflects an ability of said hypervisor to provision said computing resources within an assigned resource pool in said host computing system representing a managed subset of host resources specified by said score requester.

6. The method of claim 1, wherein said partition fitness score reflects an ability of said hypervisor to provision computing resources for a set of partitions that run components of a common workload.

* * * * *